United States Patent [19]

White

[11] Patent Number: 4,487,899
[45] Date of Patent: Dec. 11, 1984

[54] REDUCED POLYMER BUILDUP IN CONDENSER OF REACTOR VESSEL

[75] Inventor: Donald E. White, Brecksville, Ohio

[73] Assignee: The B. F. Goodrich Company, Akron, Ohio

[21] Appl. No.: 421,626

[22] Filed: Sep. 22, 1982

Related U.S. Application Data

[63] Continuation-in-part of Ser. No. 249,768, Apr. 1, 1981, abandoned.

[51] Int. Cl.$^3$ .............................................. C08F 2/16
[52] U.S. Cl. ...................................... 526/74; 526/202; 526/209
[58] Field of Search ..................... 526/202, 209, 74

[56] References Cited

U.S. PATENT DOCUMENTS 3,951,925  4/1976  Mishima .............................. 526/209
3,959,235  5/1976  Nishigaki ............................ 526/209

*Primary Examiner*—Christopher A. Henderson
*Attorney, Agent, or Firm*—Joe A. Powell; Alan A. Csontos

[57] ABSTRACT

This invention relates to a suspension polymerization process for polymerizing vinyl monomers in a reaction vessel equipped with an external cooling means, such as a reflux condenser, as well as a cooling jacket, wherein polymer buildup in said external cooling means can be substantially eliminated. This is accomplished by adding in a plurality of charges to the reaction mixture non-ionic surface active or wetting agents having a hydrophile-lipophile balance (HLB) in the range of from about 9 to about 16 thus resulting in reducing charge expansion and attendant reduction in foaming of the charge.

1 Claim, No Drawings

REDUCED POLYMER BUILDUP IN CONDENSER OF REACTOR VESSEL

REFERENCE TO RELATED APPLICATION

This application is a continuation in part of Ser. No. 249,768 filed on Apr. 1, 1981 now abandoned.

BACKGROUND OF THE INVENTION

In general, the suspension polymerization of vinyl monomer is conducted in an aqueous medium containing a catalyst, a suspending or dispersing agent, and other additives, if necessary or desirable. In carrying out the reaction the ingredients are placed in a pressure-proof reaction vessel which is equipped with a stirrer or agitator and a cooling jacket, usually cooled with water. The contents of the reactor are vigorously stirred and the temperature thereof maintained in the reaction temperature range. Since the polymerization reaction is exothermic, the cooling jacket is operated to remove the heat generated by the polymerization reaction.

However, in the suspension polymerization of vinyl halides, such as vinyl chloride, for example, the rate of polymerization rises rapidly when the reaction enters its middle or latter stage. This is primarily due to the insolubility of the polymer in the monomer(s) and causes the increased generation of heat, in the latter stages of the polymerization reaction, beyond the capacity of the cooling jacket. As a consequence, temperature control in the reactor is lost. Also, as industry uses larger and larger reactors, the surface area of the reactor does not increase in proportion to the volume of the reactor. Thus, the heat transfer area in the cooling jacket becomes insufficient to cope with productive operation on a larger scale.

In order to remedy the problem of cooling the polymerization mixture effectively in large reactors, the same have been equipped with reflux condensers. These condensers are usually of the multitubular type mounted on the top of the reactor. The vapor, including the monomer(s), from the reaction mixture rise into the condenser and return to the mixture as a cooled condensate thus helping to cool the polymerization mixture. However, the mere installation of a reflux condenser does not solve the problem completely. This is because polymer buildup occurs in the condenser which tends to block the condenser which, of course, negates its function, namely, heat transfer.

The initial limiting factor encountered when using monomer reflux cooling is the increase in the volume of the polymerization mixture or charge due to the vapor trapped therein. The polymer being formed tends to be carried to the top of the charge by the rising vapor bubbles and to remain there. Segregation of the charge in this way occurs because not enough agitator power is available to rewet the polymer suspension and pull it back into the lower part of the reactor. Another reason for the increase in the volume of the polymerization mixture or charge is that a basic increase in the viscosity of the suspension occurs due to a change in the interaction between the polymer particles of the suspension. The change in viscosity usually takes place over about a five percent conversion period when about 60% conversion is reached and results in rapid expansion of the charge.

As the vapor bubbles break through the surface of the reaction mixture considerable splashing results causing the reaction mixture to be carried up into the condenser where undesirable polymer buildup occurs. Reducing the size of the charge so as to provide more space between the surface of the reaction mixture and the entrance to the condenser does not entirely solve the problem since it defeats the purpose of using large reactors by reducing the productive capacity thereof. Accordingly, there is a strong need in the art to eliminate, or substantially reduce, charge expansion and foaming during suspension polymerization in large reactors equipped with external cooling means, such as a reflux condenser.

SUMMARY OF THE INVENTION

It has been found that when polymerizing vinyl monomers in a reaction vessel equipped with an external cooling means, such as a reflux condenser, in addition to the cooling jacket, the buildup of polymer in said condenser can be substantially eliminated. The reduction in charge expansion and attendant reduction in foaming is accomplished by adding in a plurality of charges to the reaction mixture nonionic surfactants having a hydrophile-lipophile balance (HLB) in the reange of from about 9 to 16. Unexpectedly, such addition increases the ease with which the polymer can be wet by water and then drawn down into the reaction mixture, and decreasing the viscosity of the suspension by decreasing the interaction between the polymer particles.

DETAILED DESCRIPTION

The present invention relates to suspension polymerization reactions which are conducted in an aqueous medium. The invention is particularly adapted for use in the aqueous suspension polymerization of vinyl halides and vinylidene halides, either alone or with each other, or with other vinylidene monomers having at least one terminal $CH_2=CH<$ grouping. While the present invention is specifically illustrated hereinafter in connection with the suspension polymerization of vinyl chloride to produce polyvinyl chloride (PVC), it is to be understood that this is merely for purposes of simplicity of description. When making copolymers of vinyl chloride, various polymerizable ethylenically unsaturated monomers copolymerizable with vinyl chloride may be employed. As examples of such monomers, there may be named vinylidene chloride, vinylidene fluoride, etc.; vinylidene monomers having at least one terminal $CH_2=CH<$ grouping, such as acrylic acid and esters thereof, for example, methyl acrylate, ethyle acrylate, butyl acrylate, octyl acrylate, cyano-ethyl acrylate, and the like; methacrylic acid and esters thereof, for example, methyl methacrylate, ethyl methacrylate, butyl methacrylate, and the like; styrene and styrene derivatives including α-methyl styrene, vinyl toluene, chlorostyrene, and the like; acrylonitrile, ethyl vinyl benzene, vinyl acetate, vinyl naphthalene, etc.; and other vinylidene monomers of the types known to those skilled in the art.

As pointed out hereinbefore, the present invention is particularly applicable to the suspension polymerization of vinyl chloride, either alone or in admixture with one or more other vinylidene monomers copolymerizable therewith in amounts as great as about 80% or more by weight, based on the total weight of the monomer or monomer mixture.

In suspension polymerization, the reaction is conducted in pressure reaction vessels or polymerizers which have an inner wall of stainless steel or are glasslined. The reaction vessels are equipped with suitable mechanical agitation means and baffles in order to produce and maintain the desired suspension of the monomer charge and the resulting homopolymer or copolymer. In addition, the reaction vessel is jacketed so that liquids, such as water, brine, and the like, can be circulated therethrough in order to control the temperature in the reaction vessel during the polymerization reaction. However, the polymerization of vinyl monomers is an exothermic reaction and if one desires to increase productivity by increasing the speed of the reaction, such as in making PVC, the jacket is not sufficient to remove the generated heat effectively and efficiently. Hence, one of the important aspects of the present invention is the use of a reflux condenser, preferably positioned on the top of the reactor.

In the reflux condenser, it is desirable to get as much cooling surface area as possible. Thus, the condenser comprises a shell having a number of tubes positioned internally thereof. Means are provided for circulating a cooling medium around the tubes which removes the heat of reaction as the monomer vapors rising internally of the tubes are cooled and condensed. The monomer(s) return to the reaction medium in cooled liquid form. This reflux cooling, in combination with the jacket of the reactor, controls the temperature of reaction in such a manner that faster reaction times are possible with resultant increase in productivity. It will be appreciated that the increase in heat removal capacity, when a reflux condenser is employed, allows an increase in catalyst concentration over that normally used in polymerization reactions.

As pointed out above, condensers have not been universally used in the suspension polymerization of vinyl monomers due to the deposit or polymer buildup on the interior surfaces of the condenser which requires frequent cleaning which results in excessive shut-down time. The buildup in the condenser is caused by polymer particles being carried into the condenser as a result of the splashing of the reaction mixture, particularly when the rate of reaction is increased. It has been found that splashing, or expansion of the charge, can be controlled by metering a wetting agent, or surface active agent, into the reaction mixture during the course of polymerization thereof. The critical feature of the present invention is the combination of the condenser plus the wetting agent plus the means of addition of said agent.

In order to accomplish the objectives of the present invention, the wetting agents must meet certain criteria, namely, they must be nonionic and have a hydrophile-lipophile balance (HLB) in the range from 9 to 16. By the addition of such wetting agents, control of the charge or reaction mixture expansion is accomplished by increasing the ease with which the polymer particles can be wet by water and then drawn down into the reaction mixture by the agitation mechanism. Also, the addition of said wetting agents decreases the viscosity of the suspension by decreasing the interaction between the polymer particles. The decreased interaction between the polymer particles is believed to be obtained by building up a loosely-held layer of water of hydration around each polymer particle. Thus, this loosely-bound water of hydration would tend to prevent particles from becoming attached to each other. The most effective nonionic wetting agents, or surface active agents, are those having an HLB in the range from 10 to 14. The surface active agents, having an HLB in the ranges given, absorb on the polymer particles while at the same time allowing the monomer(s) to reenter the polymer particles and allowing the water in the aqueous reaction medium to rewet the polymer particles but not penetrate the pores of the polymer particles. It was found that when a wetting agent having an HLB below 9 was employed, it was difficult to suspend in water and when used, it decreased the wettability of the polymer particles. When employing a wetting agent having an HLB about 16, it did not absorb on the polymer particles and had no effect on the suspension viscosity.

The nonionic surface active agents which are useful in the practice of the present invention and which have the proper HLB are those falling within following generic classes: (1) polyoxyetheylene alkylphenols; (2) polyoxyethylene alcohols; and (3) polyalkylene oxide block copolymers. As examples of nonionic surface active agents in classes (1) and (2) above, there may be named nonylphenoxypoly (ethyleneoxy) (6) ethanol, monylphenoxypoly (ethyleneoxy) (7) ethanol, nonylphenoxypoly (ethyleneoxy) (9) ethanol, oxtylphenoxypoly (ethylenoxy) (8) ethanol, polyoxyethylene (6) tridecyl ether, polyoxyetheylene (12) tridecyl ether, polyoxyethylene (4) sorbitan monolaurate, polyoxyethylene sorbitol oleate-laurate, and the like. With respect to class (3) above, these surface active agents are polyethylene oxide-polypropylene oxide block copolymers having the following general formula:

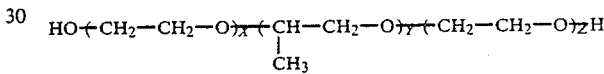

wherein the sum of X and Z is an integer from 3 to 73 and Y is an integer from 20 to 56. As examples of the block copolymer surface active agents is the family of surface active agents manufactured by BASF/Wyandotte and sold under the trademark "Pluronic".

It has been found that the satisfactory amount of surface active agent or wetting agent, useful in the present invention, will be in the range of about 0.003% to about 0.5% by weight, based on the weight of the monomer or monomers to be polymerized. Preferably, an amount of such agent(s) in the range of about 0.04% to about 0.2% by weight is employed. These surface active agents have a multiplicity of functional groups and accordingly, a very large number of modifications is possible. Mixtures of these agents can also be used. Any amounts of the surface active or wetting agents in combination may be employed so long as the combined weight thereof is within the ranges of said agents given above.

In the practice of the present invention, it is preferred to use a monomer-soluble or oil-soluble initiator in the polymerization reaction mixture. Suitable initiators are the alkanoyl, aroyl, alkaroyl, and aralkanoyl diperoxides and monohydroperoxides, azo compounds, peroxy esters, percarbonates, and other free radical producing initiators. As examples of such initiators or catalysts, there may be named benzoyl peroxide, lauryl peroxide, diacetyl peroxide, cumene hydroperoxide, methyl ethyl ketone peroxide, diisopropylbenzene hydroperoxide, 2,4-dichlorobenzoyl peroxide, naphthoyl peroxide, t-butyl perbenzoate, di-t-butyl perphthalate isopropyl percarbonate, acetyl cyclohexane sulfonyl peroxide, di-(secondary butyl)peroxydicarbonate, t-butyl peroxyneodecanoate, di(2-ethyl hexyl) peroxydicarbonate, di-(normal propyl) peroxydicarbonate, azo-bis-(2,4-dimethyl valeronitrile), and many others. The particular free radical producing initiator employed will depend upon the monomeric material(s) being polymerized, the molecular weight and color requirements of the polymer, the temperature of polymerization, etc. In the present invention, wherein reflux condensing is employed, the amount of catalyst used can be greater than normally employed in suspension polymerization systems thus resulting in a faster reaction. It has been found that an amount of catalyst in the range of about 0.02% to about 0.15% by weight, based on the weight of the monomer or monomers being polymerized, is satisfactory. However, it is preferred to employ an amount of catalyst in the range of about 0.05% to about 0.12% by weight. Further, more than one catalyst may be employed in the polymerization recipe. When employing more than one catalyst, the combined amount thereof should come within the ranges given.

In the process of the present invention a dispersing agent or dispersant is added to the aqueous polymerization medium in order to obtain a more complete and uniform dispersal of the vinyl monomer or monomers and catalyst or initiator throughout the reaction medium prior to and during the polymerization of said monomer(s). Any of the well known dispersants operative in aqueous media may be employed. These dispersants include, among others, methyl cellulose, hydroxymethyl cellulose, hydroxyethyl cellulose, methylhydroxyethyl cellulose, hydroxypropyl cellulose, methyhydroxypropyl cellulose, carboxy-methyl cellulose, polyvinyl alcohol, gelatin, polyvinylpyrrolidone, dodecylamine hydrochloride, sodium lauryl sulfonate, lauryl alcohol, sorbitan monolaurate, sorbitan palmitate, sorbitan monostearate, sorbitan monooleate, polyethylene sorbitan monolaurate, the various hydrolyzed polyvinyl acetates, and the like. One or more dispersants may be employed in combination, if desired. The most preferred dispersants are the cellulose derivatives and the hydrolyzed polyvinyl acetates. The amount of dispersant(s) employed will usually be in the range of about 0.03% to abut 0.15% by weight, based on the weight of the monomer(s) being polymerized. Preferably, an amount of dispersant(s) in the range of about 0.04% to about 0.07% is employed. Increasing the dispersant concentration helps to decrease the amount of polymer buildup.

As pointed out above, one critical feature of the present invention is the means of addition of the surface active agent(s). The prior art method of adding surface active agent(s) only at the beginning of the reaction does not give the desired results. In this invention, the surface active agent(s) is added to the reaction mixture in a plurality of charges. Applicant intends the phrase "plurality of charges" to include continuous addition and intermittent addition. The preferred method of addition of surface active agent(s) is constant metering. In order to satisfactorily reduce the splashing of the reaction mixture and avoid the polymer buildup in the condenser, the surface active agent should be metered into the reaction mixture at a constant rate during the course of the polymerization reaction until pressure drop occurs. While one can meter the surface active agent in from the beginning of the reaction, usually the metering is started when about 5% conversion of monomer(s) to polymer has been reached. In fact, the metering can be started at any time when about 5% to about 20% conversion is reached. As pointed out, the metering is continued until pressure drop occurs, which is usually when a conversion in the range of about 65% to about 75% has been reached, depending upon the monomer(s) being polymerized. Further the surface active agent or wetting agent can be added intermittently during the course of the polymerization reaction. That is, at predetermined intervals a certain predescribed amount of surface active agent(s) is added to the reaction mixture. These intervals and amounts are chosen so that all of the surface active agent(s) has been added at the time pressure drop is reached. These intervals may be equally or unequally spaced and the amount added at each interval may be the same or different. For example, when polymerizing vinyl chloride alone to make PVC serious trouble begins, i.e., excessive splashing, when about 60% conversion is reached. When adding the surface active agent(s) intermittently, provision for the addition of a larger amount should be made at this point. Also a portion of the surface active agent, for example, about one third, can be added at time zero and the remainder metered in during the course of the reaction. However, the preferred method of addition of surface active agent(s), and the best results are obtained, is by metering in at a constant rate, as described above.

It has further been found that adding all of the surface active agent(s) at the beginning of the polymerization does not accomplish the objectives of the instant invention, namely, reducing the splashing of the reaction mixture and eliminating the polymer buildup in the condenser. On the other hand, the addition of all the surface active agent(s) at the beginning of the polymerization is better than a control where no surface active agent(s) is used.

In the present invention, both the jacketed polymerization reactor and the reflux condenser are employed to maintain the temperature of the polymerizer ingredients at the appropriate and predetermined level, both prior to and during the polymerization reaction. Usually the temperature of the polymerization reaction will be maintained in the range of about 40° C. to about 80° C. To a great extent, the particular temperature employed will depend upon the particular vinyl monomer or monomers being polymerized and also, the particular initiator or initiators being used. It is preferred, however, to conduct the polymerization reaction at a temperature in the range of about 50° C. to about 70° C.

The pressures employed during the present suspension polymerization reaction will vary depending upon the monomer or monomers being polymerized and the temperature of reaction desired. The pressure should be great enough to keep the monomer or monomers in liquid form during the reaction. Usually for the purposes of the present invention, pressures between about 6.8 and about 16.4 atmospheres are sufficient. In the vast majority of the cases, the polymerization reaction is carried out at the autogeneous pressure of the monomer or monomers. It should be noted that the pressure in the condenser will usually be substantially the same as the pressure in the reactor since the condenser is kept open to the reactor at all times during the course of the polymerization reaction.

In the usual and known suspension polymerization reactions of vinyl monomers, and in particular when polymerizing vinyl chloride, the time to completion of the reaction will be in the range of about 5 hours to about 12 hours. However, when employing the process of the present invention, the time to completion of the reaction will be in the range of about 3 hours to about 5 hours. This is an advantage since it results in increased productivity per reactor.

Optionally, to insure against polymer buildup on the internal surfaces of the polymerization reactor, said surfaces, including the walls, agitator and baffles, can be coated with a polymer buildup preventive coating prior to charging the reactor. Should this option be chosen, it is not necessary to coat the internal surfaces of the condenser since, when employing the process of the instant invention, polymer buildup on the internal surfaces of the condenser is substantially eliminated. When employing a coated reactor, any of the known polymer buildup preventive coatings may be used. Examples of such coatings and methods of application can be found in U.S. Pat. No. 3,849,179—polyethyleneimine; U.S. Pat. No. 4,024,330—polyaromatic amines; U.S. Pat. No. 4,024,301—polyaromatic amines in aqueous alkali metal hydroxide; U.S. Pat. No. 4,081,248—polyaromatic amines plus a dispersant; U.S. Pat. No. 4,080,173—self condensed polyhydric phenols; U.S. Pat. Nos. 4,105,840 and 4,144,307—tannins and tannates; and U.S. Pat. No. 4,068,059—alkali soluble dyes; and the like, and many more known to the art. In the present invention, when a coated reactor is employed, it is preferred to employ condensed polyhydric phenols since these coating materials not only perform well, but they also meet Government standards and regulations.

In order to more clearly define the present invention, the following specific example is given. It is to be understood, however, that this is merely intended in an illustrative and not in a limitative sense. In the example, all parts and percents are by weight unless otherwise indicated.

EXAMPLE I

In this example the following recipe was employed in making polyvinyl chloride (PVC):

| Ingredient | Parts |
| --- | --- |
| Water (demineralized) | 200 |
| Vinyl Chloride | 100 |
| Polyvinyl alcohol [1] | 0.15 |
| Di(secondary butyl) peroxydicarbonate | 0.05 |

[1] 88% hydrolyzed polyvinyl acetate

A one liter reactor was used which was equipped with an agitator and a reflux condenser. First the water was added to the reactor and the agitator started. All of the ingredients were charged at room temperature or about 27° C. The polyvinyl alcohol was then added and thereafter the reactor was evacuated. The vinyl chloride was then added and the mixture was vigorously agitated in order to disperse the vinyl chloride in droplet form in the reaction medium. Finally, the initiator (di (secondary butyl) peroxydicarbonate) was added and the mixture heated to the reaction temperature of 57° C.

A wetting agent solution was prepared which contained 0.6 gm. of Pluronic L63 (HLB=11) in 50 gm. of demineralized water. At 18 minutes the condenser, which was open to the reactor, was turned on to 80 cc./min. of cold water circulating therethrough. At 70 minutes the addition of the L63 solution was started and it was added dropwise to the agitated reaction mixture. Pressure drop occurred at 177 minutes and the reaction cooled and the reactor vented rapidly. After removal of the reactor contents it was noted that there was no polymer buildup in the condenser and substantially no buildup on the reactor surfaces. By the addition of the L63 solution, the expansion of the reactor mixture, due to gas entrapment, was reduced from 5 cm. (normal for control with no wetting agent) to 0.5 cm. The boil-up flux was 35 kw/m² of reactor cross section.

There are many advantages in the use of the present invention, chief among which, is shorter polymerization reaction times which in turn increases productive capacity of the reactor per unit of time. Further, the present invention provides a means of using reflux condensers on polymerization reactors without the danger of deleterious polymer buildup in said condensers. Also, the polymer quality is not adversely affected by the use of the present invention. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. In a process for the suspension polymerization of vinyl chloride monomer in an aqueous medium in the presence of a dispersing agent(s) and a monomer-soluble polymerization initiator with agitation and primary cooling in a polymerization vessel, the improvement comprising mounting a reflux condenser on said polymerization vessel, said condenser being open to the vessel throughout the entire polymeriztion reaction, polymerizing said vinyl chloride monomer by maintaining the reaction mixture at a temperature in the range of about 40° C. to about 80° C., and adding into the reaction mixture at a constant rate during the course of the polymerization reaction from about 0.003% to about 0.5% by weight, based on the weight of said vinyl chloride monomer, of a nonionic surface active agent having an HLB in the range of about 9 to about 16 and selected from the group consisting of polyoxyethylene alkylphenols, polyoxyethylene alcohols, and polyalkylene oxide block copolymers having the general formula

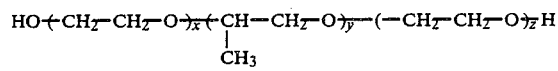

wherein the sum x and z is an integer from 3 to 73 and y is an integer from 20 to 56, wherein the addition of said surface active agent is started when conversion of monomer to polymer is in the range of about 5% to about 20%, whereby splashing of the reaction mixture and polymer buildup in said condenser are substantially eliminated.

* * * * *